United States Patent [19]

Jones et al.

[11] 4,004,099
[45] Jan. 18, 1977

[54] TIME DIVISION MULTIPLEX SWITCHING SYSTEM

[75] Inventors: Charlie Luther Jones, Jupiter; Gordon Lambert Hopkins; William Lester Schulte, Jr., both of Lake Park, all of Fla.

[73] Assignee: RCA Corporation, New York, N.Y.

[22] Filed: Oct. 20, 1975

[21] Appl. No.: 624,309

[52] U.S. Cl. .......................... 179/15 AL; 179/15 A; 179/15 AN; 179/15 AT

[51] Int. Cl.² .......................................... H04J 3/10

[58] Field of Search ....... 179/15 AL, 15 A, 15 AA, 179/15 AT, 15 BA, 15 AN

[56] References Cited
UNITED STATES PATENTS

| | | | |
|---|---|---|---|
| 3,643,030 | 2/1972 | Sparrendahl | 179/15 AL |
| 3,804,989 | 4/1974 | Carbrey | 179/15 AA |

Primary Examiner—David L. Stewart
Attorney, Agent, or Firm—Carl V. Olson; Edward J. Norton

[57] ABSTRACT

A time division multiplex private automatic branch exchange includes a common interchange bus, and as many sampling circuits and associated recirculating shift registers as there are telephones. Two telephones are connected to each other through the bus when time-slot-determining outputs of the respective two shift registers actuate transmission gates in the respective sampling circuits. Other pairs of telephones may be connected to each other during other time slots. Additional sampling circuits and shift registers are provided to connect dial tones, ring tones, etc., over the bus to appropriate telephones in the same time division sampling fashion. All sampling connections are made under control of a computer by loading information into time slot stages of the shift registers.

1 Claim, 2 Drawing Figures phone exchange in
which three telephones 10 are shown to represent a
much larger number such as 100 or 300 of telephones.
Each telephone is connected by a two-way telephone
line 12 to a sampling circuit 14. Each sampling circuit
14 permits the connection of the respective telephone
line to a common interconnection bus consisting of an
output bus 16, a bus amplifier 18 and an input bus 20.

TIME DIVISION MULTIPLEX SWITCHING SYSTEM

BACKGROUND OF THE INVENTION

The most common current practice in telephone communication systems generally is to establish a solid connection between a calling line and a called line via a path which is associated individually and uninterruptedly with the connection for the duration of the call. Thus a quantity of equipment, dependent upon the number of lines served and the expected frequency of service, is provided in a common pool from which portions may be chosen and assigned to a particular call. Such an arrangement is referred to as "space division" in which the privacy of each conversation is assured by the division or separation of individual conversations in space.

In contrast, communication systems have been developed which operate on a time division basis in which a number of conversations share a single spatial communication highway or bus. Privacy of conversation is assured in such systems by the division or separation of individual conversations in time. Thus each conversation is assigned to the common spatial highway for an extremely short, periodically recurring interval, called a time slot, and the connection between any two lines in communication is completed only during the assigned interval or time slot. Samples which retain essential characteristics of the voice or other signal are transmitted over the common highway in these time slots and are utilized in the called line to reconstruct the original signal.

Existing time division multiplex telephone systems are designed to handle a very large number of telephones. There is a need for a smaller private automatic branch exchange (PABX) having the economy, the flexibility, and the adaptability to computer control possessed by the time division multiplex (TDM) approach, particularly as an integral part of a computer-controlled property-management system including perhaps 150 telephones and apparatus for managing the business of the property, which may be a hotel, motel, hospital, school, or the like.

SUMMARY OF THE INVENTION

A time division multiplex private automatic branch exchange is constructed to permit any two or more of a plurality of telephones to be connected to each other over a common bus during periodically-recurring signal-sampling time slots. Other telephones may be connected to each other over the same bus during other time slots. For each telephone line there is a sampling circuit, and a circulating shift register having stages corresponding to time slots. Binary information in a shift register determines the time slot during which the respective telephone is connected to the bus by the respective sampling circuit.

DESCRIPTION OF THE PREFERRED EMBODIMENT

Figure 1:
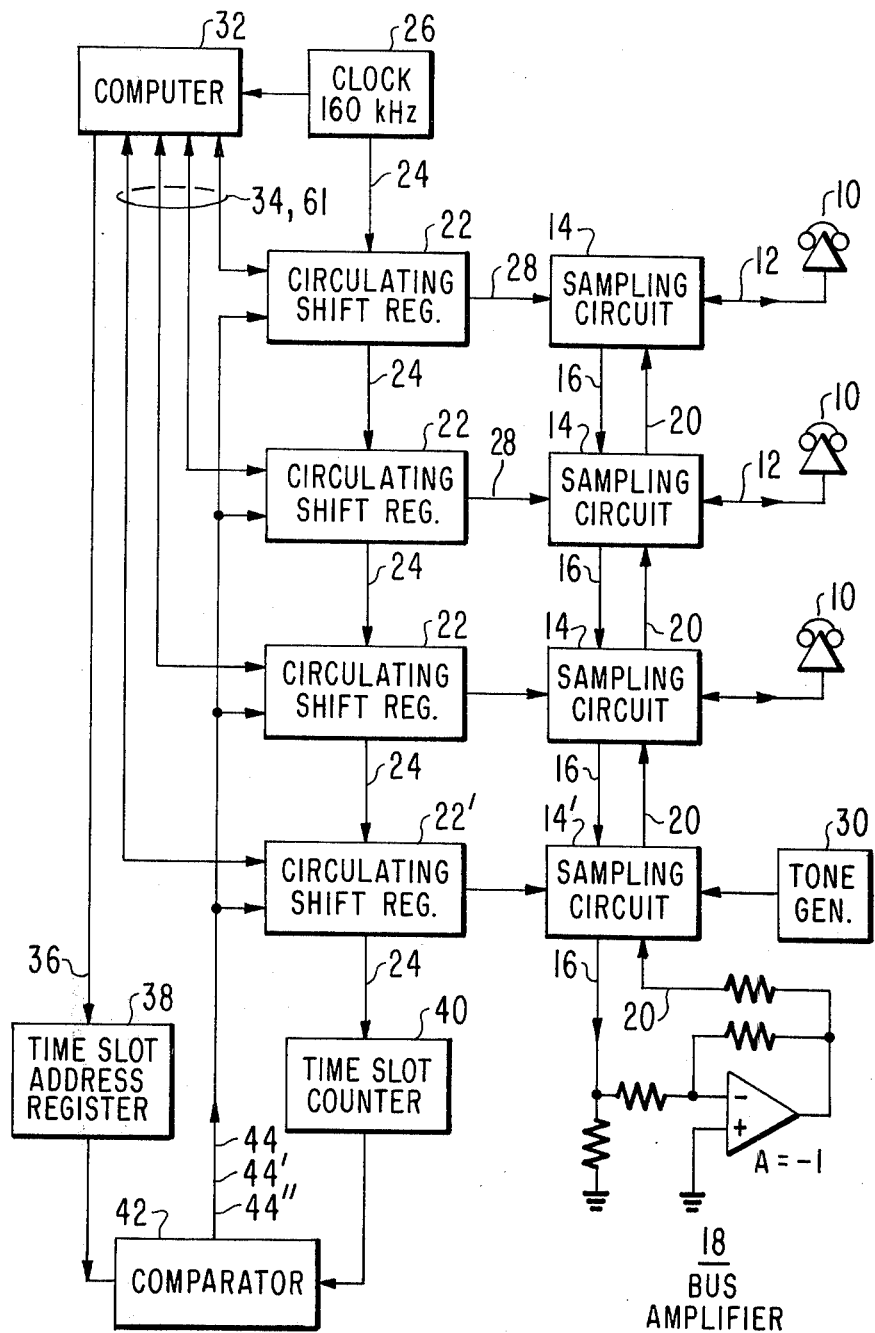
FIG. 1 is a simplified block diagram of a computer-controlled time division multiplex private automatic branch exchange telephone system constructed according to the teachings of the invention.

FIG. 1 is a diagram of a PABX telephone exchange in which three telephones 10 are shown to represent a much larger number such as 100 or 300 of telephones. Each telephone is connected by a two-way telephone line 12 to a sampling circuit 14. Each sampling circuit 14 permits the connection of the respective telephone line to a common interconnection bus consisting of an output bus 16, a bus amplifier 18 and an input bus 20.

Each telephone 10, telephone line 12 and sampling circuit 14 is associated with a respective circulating shift register 22. Each circulating shift register 22 has a number of stages which define an equal number of time division multiplex time slots. An information bit inserted into the first stage of the shift register is continuously advanced from stage to stage by a clock pulse applied over line 24 from a clock 26. When the bit reaches the last stage of the shift register 22, a time slot gating signal is applied over line 28 to sampling circuit 14 during the time slot, equal to the interval between clock pulses, before the bit is coupled back to the first stage of the shift register for recirculation through the shift register. Each time the bit in the circulating shift register reaches the last stage of the shift register, the resulting time slot gating signal applied over line 28 to the respective sampling circuit 14 causes a sampling connection of the respective telephone 10 to the common bus 16, 20. The sampling circuit 14 and circulating shift register 22 will be described in greater detail in connection with FIG. 2.

A tone generator 30 is associated with a sampling circuit 14' identical to sampling circuits 14, and with a circulating shift register 22' identical to circulating shift registers 22. The tone generator 30 and associated circuits are representative of a plurality of means in the PABX system of FIG. 1 for supplying a dial tone to a telephone 10 when removed from the hook, a ring tone to a called telephone 10, a ring back tone to a calling telephone 10, and the like.

The time division sampling connection of two telephones to each other through the common bus 16, 20 is accomplished by a computer 32 which supplies 1 bits to corresponding time slot positions in the circulating shift registers associated with the two telephones over lines 34. At the same time, the computer supplies the address or identification of the time slot over line 36 to a time slot address register 38. A time slot counter 40 receives clock pulses over line 24 from clock 26 and maintains the number or address or identification of the time slot presently accessible to an input from the computer 32. When the presently accessible time slot address in counter 40 matches the computer-supplied address in time slot address register 38, the comparator 42 produces a "write" pulse on output line 44 which enables the transfer to the circulating shift registers of 1 and 0 bits in accordance with desired sampling telephone connections during the corresponding time slot.

Figure 2:
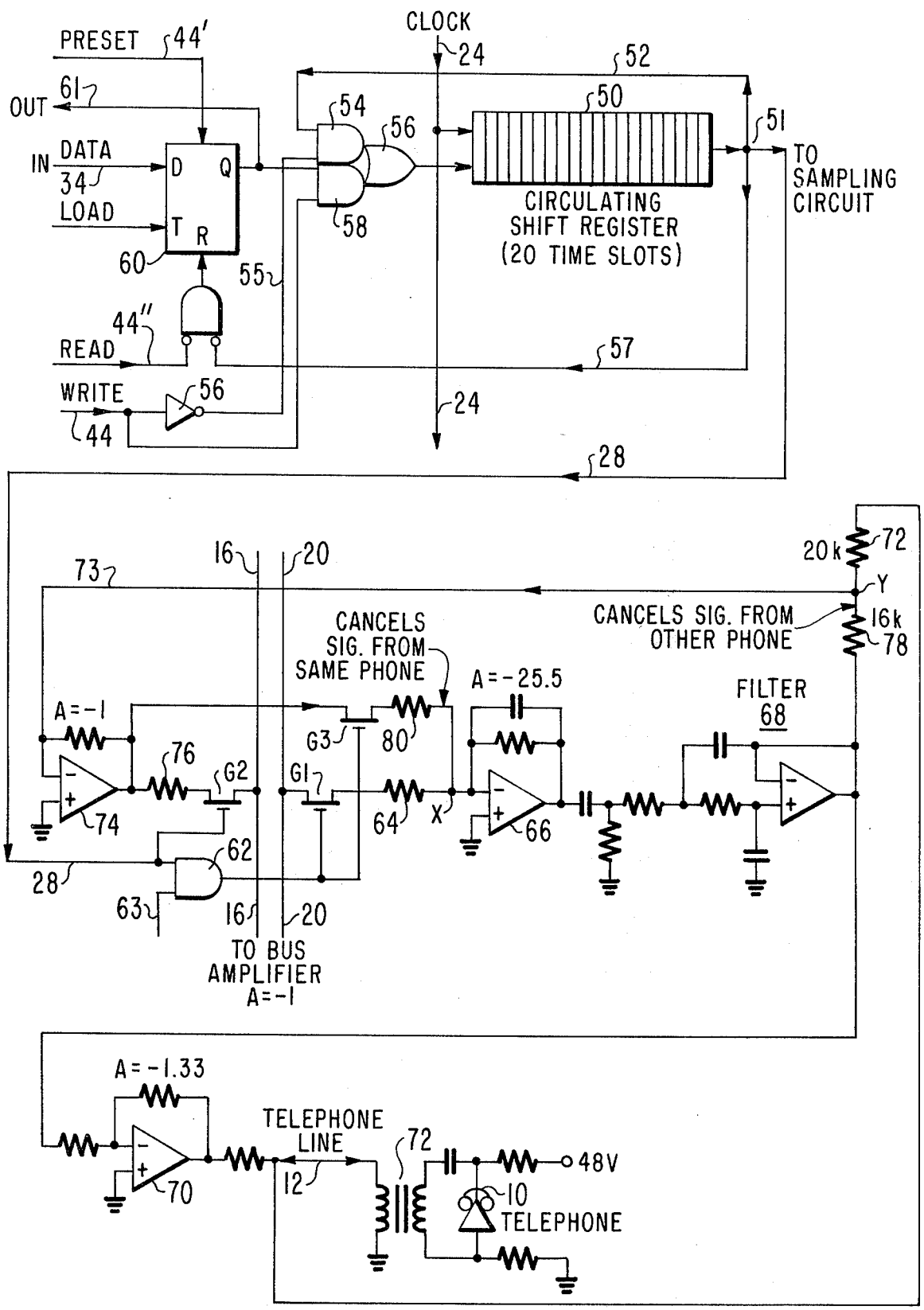
FIG. 2 is a detailed diagram of a circulating shift register and sampling circuit suitable for use with each telephone line in the system of FIG. 1.

In FIG. 2 a circulating shift register 22 in FIG. 1 is shown in greater detail as including a shift register 50 having 20 stages, by way of example, and having an information recirculation path 52 from the output stage back to the input stage through an "and" gate 54 and an "or" gate 56. The "and" gate 54 is continuously enabled over line 55 from an inverter 56 in the absence of a "write" signal on line 44 from the comparator 42 in FIG. 1.

When a "write" signal is present to enable "and" gate 58, the bit stored in a flip-flop 60 is transferred through "or" gate 56 to the first stage of the shift register 50. The bits in all flip-flops 60 are received from the computer 32 over lines 34 at the same time that the time slot address is received by the time slot address register 38 over line 36 from the computer 32.

The feedback path 57 is used for reading the content of the shift register 50, one stage at a time, during respective time slots specified by the computer 32. The computer 32 provides a read command and time slot address via lines 36 to the time slot address register 38. When the count in the time slot counter 40 matches the contents of the time slot address register 38, a "preset" signal is generated on line 44' to set flip-flop 60 to a 1. When the preset signal is removed, a "read" signal is generated on line 44" to allow gate 90 to gate the inverted output of shift register 50 back on line 57 to make the output of flip-flop 60 equal the content of the shift register during the time slot being read. Line 61 from flip-flop 60 allows the computer 32 to read the content of the shift register 22 at any desired time slot.

When a 1 bit in a time slot circulating from stage to stage in the shift register 50 reaches the last stage, the output at 51 is coupled over line 28 to the control electrode of a first transmission gate G1, and through "and" gate 62 to the control electrode of a second transmission gate G2 and the control electrode of a third transmission gate G3. A timing signal, with pulse width less than the width of the time slot, is applied at 63 to enable the gate in such a way as to prevent sampling overlap between adjacent time slots. The transmission gates G1, G2 and G3 are CMOS transmission gates.

The current-conduction electrodes of the first transmission gate or switch G1 are connected in a path from input bus 20 to the telephone line 12 through a summing resistor 64, a summation point X, an inverting amplifier 66 having a gain of −25.5, a low-pass filter 68, and an inverting amplifier 70 having a gain of −1.33. The telephone line 12 is coupled through a transformer 72 to the telephone 10.

The current-conduction electrodes of the second transmission gate or switch G2 are connected in a path from the telephone line 12 to the output bus 16 through a summing resistor 72, a summation point Y, a line 73, an inverting amplifier 74 having a gain of −1, and an isolating resistor 76. The input of amplifier 70 is connected through a summing resistor 78 to the summation point Y.

The current-conduction electrodes of the third transmission gate or switch G3 are connected in a path from the output of amplifier 74 through a summing resistor 80 to the summation point X.

OPERATION

The shift register 50 is shown in FIG. 2 with 20 stages to provide 20 time slots for a maximum of 20 simultaneous conversations with up to four telephones per conversation. The two circulating shift registers 22 (FIG. 1) associated with two communicating telephones have circulating 1 bits which arrive at the outputs 28 of the shift registers at the same time, so that the two associated sampling circuits 14 connect both telephones to the bus 16, 20 during the same time slot. The circulating 1 bits arrive at the output at a repetition rate of 8000 times per second, to take 8000 samples of the audio signal per second. An audio signal sampled at this rate can be passed through a low pass filter (68) to faithfully reproduce an audio signal having frequencies up to 4000 Hz.

The computer 32 controls the interconnections of telephones by loading 1 bits into appropriate time slot positions in the circulating shift registers associated with the telephones. Bits are loaded over lines 34 to the flip-flop 60 in circulating shift registers 22 associated with telephones to be connected to the bus. One corresponding time slot position in all circulating shift register 22 are accessed at one time by supplying the time slot address to the time slot address register 38 over line 36. The time slot counter 40 counts the time slots as they reach the data input stages of all shift registers. When the contents of the time slot address register 38 and the time slot counter 40 are equal, the comparator 42 supplies a write pulse over line 44 to the "and" gates 58 causing the contents of the flip-flops 60 to enter the circulating shift registers in the same time slot. All entries to another time slot position are made by supplying the new time slot address to the time slot address register 38. The contents of the shift registers at any time slot position may be read in a similar manner.

The tone generator 30, which may be a dial tone, a ring tone, a ring back tone or any desired tone, is connected to the bus by a sampling circuit 14' and a circulating shift register 22' which operates just like the telephone units 14 and 22. The 1 bit in the circulating shift register 22' will be in the same time slot as a 1 bit in the register 22 of the telephone intended to receive the tone. The tone generator connected to the telephone during one time slot may also be connected to another telephone during another time slot.

All connections between telephones, tone generators and like units are made over the single interconnecting bus 16, 20 in interlaced, time division multiplex, pulse amplitudes modulation fashion.

When a 1 bit in shift register 50 reaches output 51 to define a time slot, the 1 bit is applied over line 28 to enable the transmission gates G1, G2 and G3 and connect the telephone line 12 to the output bus 16 and the input bus 20.

The input bus 20 is connected through G1, summing resistor 64, amplifier 66, filter 68 and amplifier 70 to telephone line 12 to supply an audio signal from the bus to the telephone 10. It is important to prevent the audio signal supplied to telephone line 12 from also passing around a loop including line 73, amplifier 74, output bus 16, bus amplifier 18 (FIG. 1) and back through the input bus 20 to the telelphone originating the audio signal. Such an amplifier feed-back signal would cause oscillations and intolerable instabilities in the system. The feedback is prevented by the summing resistor 78 connected from the input of inverting amplifier 70 to the summation point Y. The values of resistors 72 and 78 are selected in accordance with the inverting gain (−1.33) of amplifier 70 to cause a cancellation on line 73 of any audio signal arriving from the input bus 20. This does not interfere with the coupling of the audio signal from the input bus 20 to the telephone line 12 and the telephone 10.

The telephone 10 is connected to supply an audio signal to the output bus 16 over a path including telephone line 12, resistor 72, inverting amplifier 74, isolating resistor 76 and transmission gate G2. It is important that this audio signal is not permitted to be amplified and returned to the same telephone 10 through bus amplifier 18 (FIG. 1), input bus 20, transmission gate G1, summing resistor 64, amplifier 66, filter 68 and amplifier 70. Severe instabilities would result. The feedback is prevented by a signal cancelling path from the amplifier 74 including third transmission gate G3 and summing resistor 80 to summation point X. The audio signal from amplifier 74 also reaches summation point X by going through gate G2, inverting bus amplifier 18, gate G1 and summing resistor 64. The values of summing resistors 64 and 80 are selected in accordance with the gain of inverting bus amplifier 18 to cause a cancellation at point X of the audio signal from the telephone 10. In the example, the resistor 64 and 80 have equal values, and the inverting bus amplifier has a gain of −1.

What is claimed is:

1. A time division multiplex private automatic branch exchange system for $n$ telephones, comprising
   a common interconnection input bus and output bus,
   a bus amplifier connected from said output bus to said input bus,
   $n$ sampling circuits each including a unidirectional signal path loop from said input bus through a first transmission gate and an inverting amplifier to a connection with a respective telephone and on through a second transmission gate to said output bus,
   means coupling the input and output of said inverting amplifier to cancel signals in the path to said output bus which arrived on said input bus from a telephone associated with another sampling circuit, whereby to prevent the return of signals from the other telephone back to the other telephone,
   an additional path in each sampling circuit including a third transmission gate connected in parallel with the path including said bus amplifier to cancel signals from said respective telephone that would otherwise return through said bus amplifier to said respective telephone,
   $n$ simultaneously-clocked recirculating shift registers each having a plurality of stages providing an equal number of signal-sampling time slots, and each having an output coupled to the transmission gates in a respective sampling circuit, and
   means to insert 1s in corresponding stages of at least two predetermined ones of said shift registers, said insert means including a flip-flop associated with each of said $n$ shift registers, a computer connected to load 1s in predetermined ones of said flip-flops, gate means to transfer the contents of said flip-flops to input stages of said shift registers, a time slot address register connected to receive from said computer the number of said corresponding stages in the shift registers, a time slot counter operated from the same clocking means which advances the shift registers, and a comparator for comparing the number in the time slot address register with the number of the time slot counter and operative to enable said gate means when a coincidence occurs, whereby to make a signal-sampling interconnection between the corresponding two telephones through said bus every time the 1s in the two recirculating shift registers simultaneously reach the outputs thereof and enable the respective transmission gates.

* * * * *